July 5, 1960 W. M. SCHOENFELDT 2,943,618
PICKLING UNIT FOR INTERNAL COMBUSTION ENGINES
Filed May 8, 1959 2 Sheets-Sheet 1

INVENTOR.
WILLIAM M. SCHOENFELDT
BY
Elliott & Pastoriza
ATTORNEYS

July 5, 1960 W. M. SCHOENFELDT 2,943,618
PICKLING UNIT FOR INTERNAL COMBUSTION ENGINES
Filed May 8, 1959 2 Sheets-Sheet 2

INVENTOR.
WILLIAM M. SCHOENFELDT
BY
Elliott & Pastoriza
ATTORNEYS

United States Patent Office 2,943,618
Patented July 5, 1960

2,943,618

PICKLING UNIT FOR INTERNAL COMBUSTION ENGINES

William M. Schoenfeldt, 1016 Benedict Canyon, Beverly Hills, Calif.

Filed May 8, 1959, Ser. No. 811,839

7 Claims. (Cl. 123—198)

This invention relates generally to accessories for internal combustion engines and more particularly to an accessory unit for automatically introducing a petroleum preservative into the cylinders of such engines.

While the preferred embodiment of the invention is designed for use with automobile engines, it is to be understood that the basic principles thereof are applicable to any internal combustion type engine such as used in stationary installations or in boats, aircraft, and similar transportation vehicles.

As is well known to those skilled in the art, complete combustion of the air-fuel mixture in an internal combustion engine is generally not possible primarily because of the imperfect ratio of the air and fuel over the complete operating range of the engine. As a consequence of this incomplete combustion, hard carbon and other deleterious products of combustion tend to deposit on the cylinder walls and piston heads. These deposits combine with moisture and water resulting from the condensation and the combustion of oxygen and hydrogen to result in corrosive acids which, over long periods of time when the engine is not operating can seriously deteriorate the cylinder walls and piston heads. When an engine is operated fairly frequently, acids and other corrosive products do not have sufficient time to seriously impair the engine. During actual operation, the engine is sufficiently hot to vaporize moisture and very little corrosion takes place. Most damage occurs, accordingly, when the engine is not running.

In addition to the foregoing, when an engine is turned off, gasoline which has not been burned is sucked into the cylinders and condenses on the cylinder walls dissolving and washing away any protective film of oil which normally coats these walls during engine operation. Thus, the cylinders are exposed to accelerated attack by the above mentioned corrosive acids and combustion by-products during an engine shutdown period.

The foregoing problems with engine corrosion are well known to military aircraft personnel and operators of large vehicle fleets. It is common practice, accordingly, to protect the internal combustion engines of such vehicles by a process known as "pickling." Essentially this "pickling" process involves the introduction of a petroleum preservative and rust inhibitor to the inner cylinder walls and other surfaces subject to corrosion. Generally, the pickling operation must be performed by a person trained to do the job and can become not only expensive but time consuming.

Bearing the foregoing in mind, it is a primary object of the present invention to provide an automatic pickling unit for introducing a petroleum preservative into internal combustion engines whereby corrosion and general deterioration of the cylinder walls and piston heads is considerably diminished.

More particularly, it is an object to provide an automatic pickling unit particularly adapted to the internal combustion engines of automobiles which is effective when the engine is turned off to the end that the pickling solution is introduced at that time when its preventative characteristics are most needed.

Still another important object is to provide a unit of the foregoing type which is completely automatic in operation so that the driver of a vehicle need perform no other functions than those normally performed in starting and stopping an engine.

Another object is to provide a pickling unit that can be very economically manufactured and installed in conventional automobiles without requiring any major modifications of the engine or other accessories thereto other than the connection of a simple hose line and reconnection of certain wires in the motor starter and ignition system.

Other objects of the invention are to provide a pickling unit meeting the foregoing objects which will provide a metered quantity of pickling oil to the engine cylinders and simultaneously maintain the engine turning over during the introduction of the pickling oil notwithstanding that the operator of the vehicle has already turned off the ignition key switch. By this feature, all of the internal surfaces of the engine are provided with a protective film and repeated quantities of the metered portions may be applied by simply turning on and off the ignition switch.

Briefly, these and many other objects and advantages of the present invention are attained by providing a basic unit including, in combination, a reservoir or container of the dsired petroleum preservative or pickling oil; a pump means; and a time delay switch means. The arrangement is such that the pump means is responsive to shutting off of the engine for delivering a metered portion of the pickling oil from the reservoir to the engine cylinders. The time delay means in turn automatically maintains the turning over of the engine for a given period of time and is responsive to actuation of the pump means.

In one embodiment of the invention, the continued turning over of the engine after the ignition switch has been turned off by the operator is accomplished by connecting the time delay switch means in series between the automobile battery and ignition coil. By this arrangement, the engine will continue to turn over under its own power until the time delay switch opens at the end of the time delay period. In a second embodiment, the time delay switch is connected into the starter motor circuit to operate the starting motor and thus turn the engine over by external power for the given time delay period so that no actual combustion is taking place within the engine cylinders during the pickling operation.

A better understanding of the invention as well as further features and advantages thereof will be had by referring to the preferred embodiments thereof as illustrated in the accompanying drawings, in which.

Figure 1:
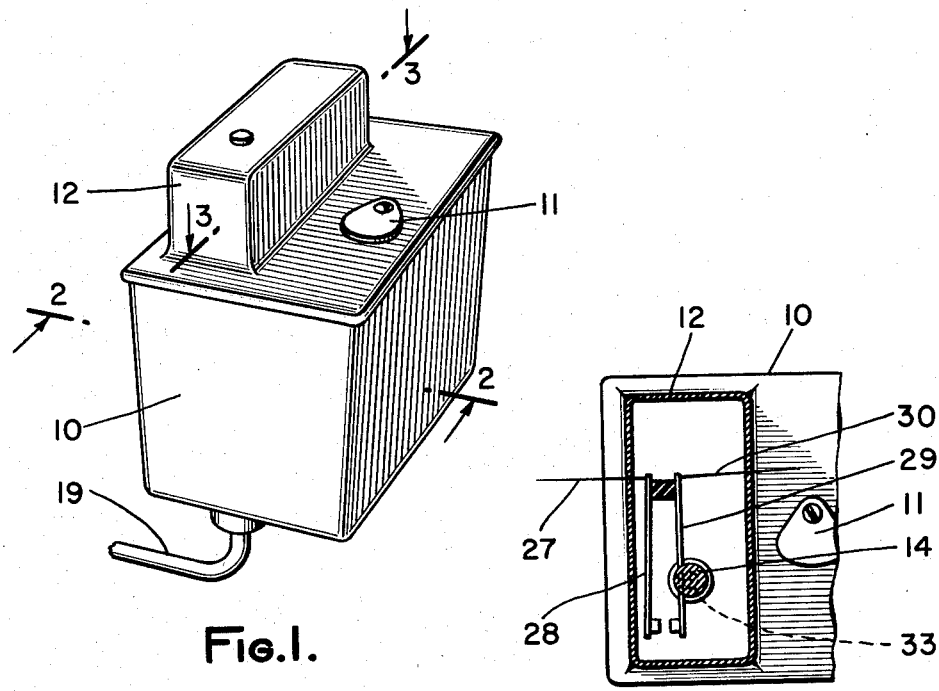
Figure 1 is a perspective view illustrating the overall unit.

Referring first to Figure 1, there is illustrated a pickling oil reservoir or container 10 provided with a fill hole cover 11. A simple housing 12 is shown mounted on top of the container 10 for housing certain control components of the device to protect the same from dirt, dust, and the like. The entire overall dimensions of the unit need not exceed 3 x 4 x 4 inches but, of course, could be made larger depending upon the desired size of the oil preservative reservoir.

Figure 2:
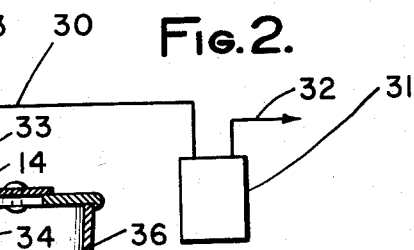
Figure 2 is a cross section taken in the direction of the arrows 2—2 of Figure 1.
Figure 3:
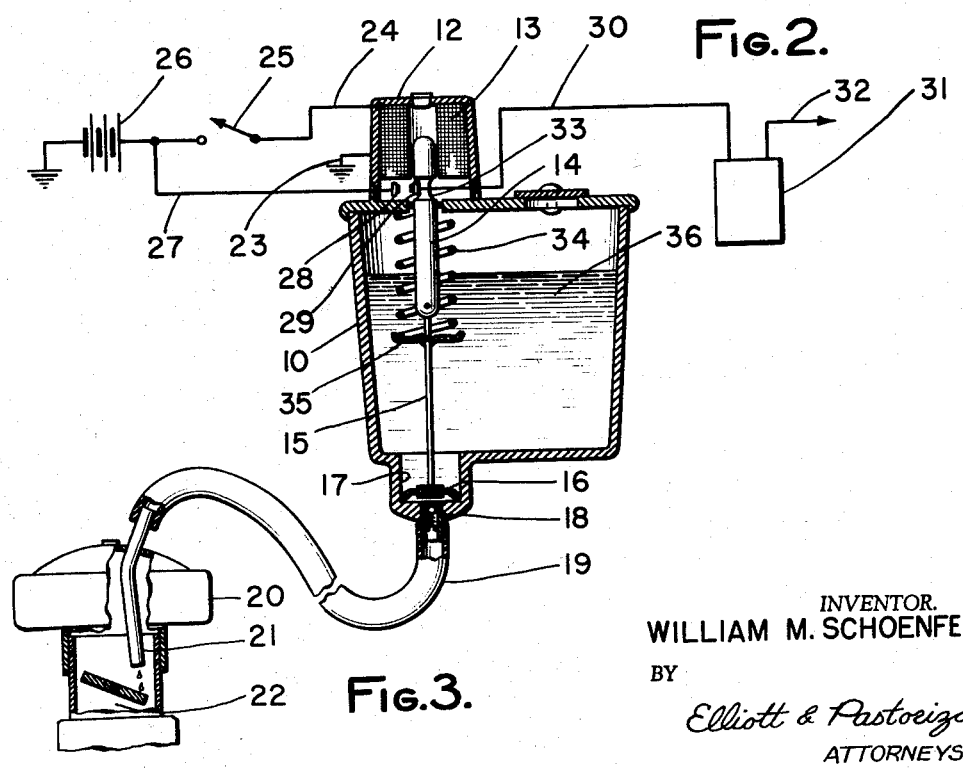
Figure 3 is another cross section taken in the direction of the arrows 3—3 of Figure 1.

Referring now to Figures 2 and 3, the basic components making up the overall mechanism are illustrated. As shown, within the housing 12 there is provided a solenoid including solenoid coils 13 co-operating with a plunger 14 illustrated in Figure 2 in its lowermost position. The lower end of the plunger 14 is connected by a piston rod 15 to a piston head 16 reciprocable within a cylindrical chamber 17 disposed at the lower end of the container 10 and in communication with the interior of the reservoir as shown. At the bottom of the cylindrical chamber 17, there is provided a first check valve 18 and outlet passage for connection to a flexible conduit 19. The conduit 19 passes into the engine air filter 20 to terminate in a nozzle 21 extending into the venturi portion 22 of the engine carburetor. The plunger 14, piston rod 15, piston head 16, and cylindrical chamber wall 17 serve as a pump for passing pickling oil from the reservoir 10 out the outlet check valve 18 and conduit 19 to the throat 22 of the carburetor.

As shown in Figure 2, one end of the solenoid coils is grounded at 23 and the other end connects to a lead 24 passing out of the housing 12 to connect to one side of the ignition switch 25. The other side of this switch connects to the automobile battery 26. With reference to both Figures 2 and 3, a lead 27 passes directly from the battery 26 to a first contact 28 within the housing 12. Contact 28 co-operates with a second contact 29 biased away from the contact 28 into physical engagement with the plunger 14. From the contact 29 a lead 30 connects to the ignition coil 31 provided with the conventional output lead 32 to the disributor. The foregoing circuit provides a time delay switch constituting the contacts 28 and 29 in series between the battery 26 and ignition coil 31.

The plunger 14 is provided with an annular indented or recessed portion as indicated at 33 for receiving the switch contact 29 and permitting the contacts 28 and 29 to open when the plunger 14 and piston head 16 are in their lowermost position. The plunger is normally biased to this position by a suitable compression spring 34 position between a spring support 35 secured to the rod 15 and the upper cover of the container 10 as shown.

Figures 4, 5:
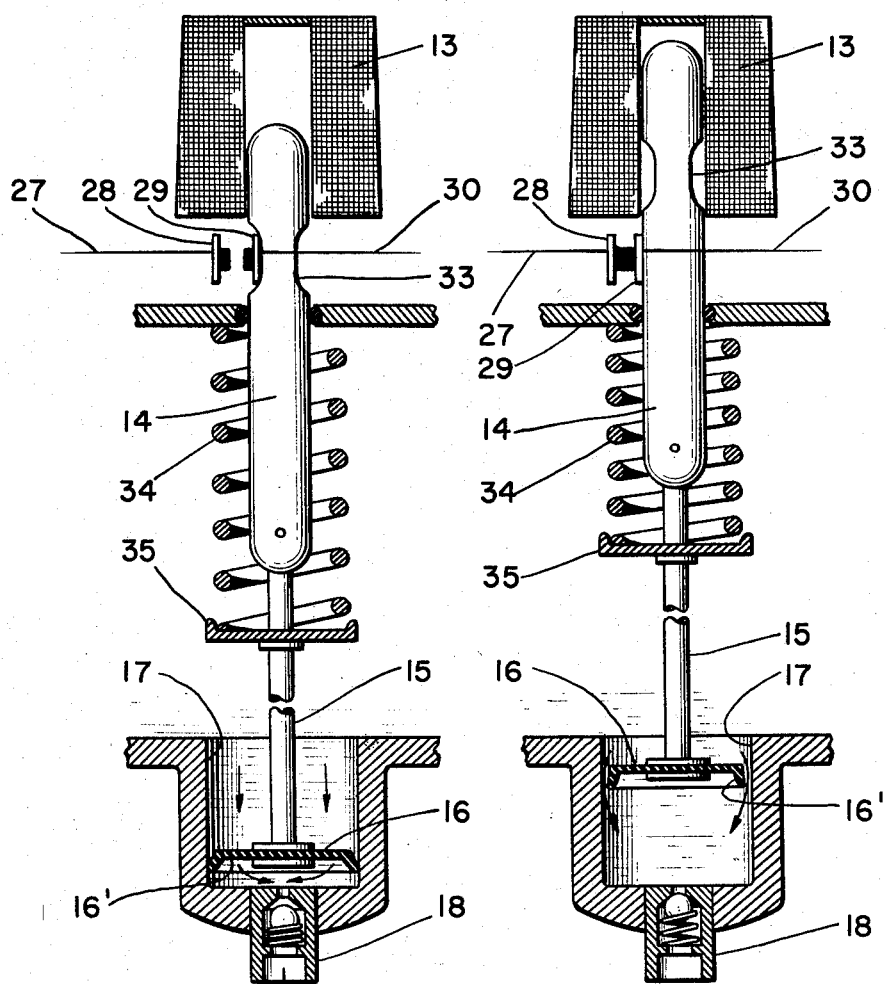
Figure 4 is an enlarged schematic view of the major moving components of the unit showing the relative position of these components a short period after the ignition switch has been turned off.
Figure 5 is another view similar to Figure 4 illustrating the relative position of the components just after the ignition switch has been turned on and the engine is being operated.

The manner in which this time delay switch and solenoid operated pump operates will be better understood by now referring to Figures 4 and 5.

Figure 4 illustrates the position of the plunger 14, piston head 16, and switch contacts 28 and 29, at substantially the completion of a downstroke of the plunger. This position corresponds to that shown in Figure 2 and is substantially the relative position of the components when the coils 13 are de-energized and the engine is not in use.

When the ignition switch 25 of Figure 2 is closed, the solenoid coils 13 will be energized to pull the plunger 14 upwardly from the position shown in Figures 2 and 4 to the position illustrated in Figure 5. When the coils are first energized, upward movement of the plunger to the position illustrated in Figure 5 will result in oil by-passing about the piston head 16 into the chamber 17. This by-passing is effected by means of an annular flexible lip 16' surrounding the piston head which can flex downwardly to permit oil to pass from the reservoir into the chamber as indicated by the arrows in Figure 5. Upward movement of the solenoid plunger will also result in the plunger itself camming the contact 29 into engagement with the contact 28 to complete the connection from the battery 26 to the ignition coil 31 so that the automobile engine may be started in a conventional manner. As long as the switch 25 remains closed, the coils 13 will remain energized and the plunger 14 will remain in nthe position illustrated in Figure 5.

When the engine is turned off as by opening the ignition switch 25, the coils 13 are de-energized and the spring 34 will then urge the piston head 16 downwardly. This downward movement of the piston head will cause the annular lip 16' to flex outwardly into complete peripheral engagement with the cylindrical walls of the chamber and thus force oil under the piston head through the outlet check valve 18 as indicated by the arrows in Figure 4. The annular lip 16' essentially serves the function of a second check valve and could be replaced by such a second check valve if desired.

The movement of the piston head from the position illustrated in Figure 5 towards the position illustrated in Figure 4 will take a finite time and the contacts 28 and 29 of the time delay switch will thus remain closed until the plunger reaches its lowermost position and the contact 29 is received within the annular recess 33. Since the contacts 28 and 29 are still closed during the majority of the downward movement of the piston 16, electrical contact between the battery 26 and ignition coil 31 is still maintained and the engine will continue to turn over under its own power. The metered portion of pickling oil passing through the conduit 19 of Figure 2 will, therefore, be aspirated from the carburetor throat into all of the cylinders of the engine and provide the desired protective coating therein.

When the pumping operation has been completed as is the case when the piston head 16 reaches its lowermost position, the contacts 28 and 29 will automatically open thereby shutting off the ignition coil and stopping the engine in the conventional manner. The various components will then be in the position illustrated in Figures 2 and 4 and no further action is necessary until the car is again started as by closing the ignition switch 25.

It is evident from the foregoing that each time the engine is turned off as by opening of the ignition switch, a metered portion of pickling oil as determined by the volume of the chamber 17 will be supplied to the cylinders and this introduction of the oil is completely automatic and requires no thought on the part of the driver. It will also be evident that in the event it is contemplated that the engine will be shut down for a considerable length of time, a series of metered portions of pickling oil can be supplied to the cylinders by simply turning the ignition key 25 on and off a few times to reciprocate the piston up and down a corresponding number of times.

In some installations, it may be desirable to effect a turning over of the engine during the desired time delay period while the pickling oil is being pumped into the cylinders by means other than actual ignition of combustible products within the cylinders. To this end, there is illustrated in Figure 6 a modified wiring system for the unit which will provide the additional turning over the engine by the starter motor itself rather than through ignition of combustible fuel within the cylinders.

Figure 6:
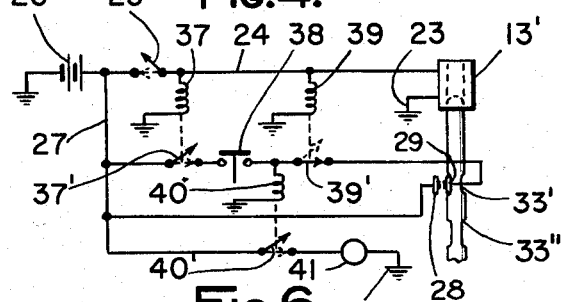
Figure 6 is a schematic diagram illustrating a modified embodiment of the invention.

In Figure 6, the same numerals are employed to designate parts corresponding to those illustrated in Figures 2, 3, 4, and 5. As shown, the solenoid container and coils are schematically represented in Figure 6 by the block 13' which coils as before are connected through the lead 24 to the ignition switch 25. Also as in the prior connections, the lead 27 passes directly from the battery 26 to the contact 28 of the time delay switch. In Figure 6 double annular indented portions are provided on the plunger as indicated at 33' and 33".

From the lead 24 to the right of the ignition switch 25 there is provided a power relay 37 having switch arm 37' in series with the conventional starter button 38. Also connected between the lead 24 and ground is a normally closed relay 39 having its switch arm 39' also connected in series between the starter button 38 and the other contact 29 of the time delay switch. The starting motor relay 40 is in turn connected between the push button 38 and switch arm 39' and ground as shown and its contact arm 40' serves to connect the battery 26 through the lead 27 to the starting motor 41, the other side of which is grounded at 42. It is thus seen that rather than connecting the right hand side of the time delay switch 29 to the ignition coil, it is instead connected to one of the contacts of the relay contact arm 39'.

In the operation of the circuit of Figure 6, with the ignition 25 open as shown, the relays 37 and 39 are de-energized and the switch arms 38' and 39' are respectively opened and closed as shown in solid lines. Further, the solenoid coils 13 are de-energized so that the plunger is in its lowermost position and the switch contacts 28 and 29 are open. Also, the starting motor relay 40 is de-energized and the corresponding relay switch contact 40' is open all as shown in solid lines.

When the ignition switch 25 is closed, the relays 37 and 39 are immediately energized to close the contact arm 37' and open the contact arm 39' as shown in dotted lines. Simultaneously, the solenoid coils 13 are energized to raise the solenoid plunger momentarily closing the contacts 28 and 29 and then permitting them to open when received in the second annular indent 33''. No current will pass from the lead 27 through the contacts 28 and 29 to the starting relay 40, however, since the normally closed relay contact arm 39' is now open. On the other hand, depression of the start button 38 will complete a circuit through the starting motor relay 40 from the lead 27, switch arm 37', now closed, contact button 38, and relay 40 to ground. Energization of the motor relay 40 will close the contact arm 40' to complete a circuit from the battery 26 and lead 27 through the starting motor 41 to ground at 42 thereby turning the engine over to start the same. The starting motor will be de-energized when the start button 38 is released in a conventional manner. The automobile may then be operated as desired.

When the engine is turned off by opening the ignition switch 25, the solenoid coils 13 will be de-energized and thus the spring 34 of Figures 4 and 5 will start returning the piston head and plunger to their lowermost position. The contacts 28 and 29 will remain open for a brief period because of the linear extent of the second detent 33''. This period is sufficient to permit the engine to stop turning over. As the plunger continues downwardly, the contacts 28 and 29 will close during a delay period afforded by the finite time for the plunger to move from its upper to its lowermost position described heretofore in connection with Figures 4 and 5. With the ignition switch 25 open, the relay 39 will be de-energized closing the switch arm 39' so that a circuit from the battery 26 through the lead 27, contacts 28 and 29, switch arm 39', and starting relay 40 is maintained. Thus, the switch arm 40' is closed shortly after the ignition switch 25 is open to actuate the starting motor 41 and start the engine turning over during the time delay period until the plunger has reached its lower-most position at which time the contacts 28 and 29 open. Opening of these contacts will de-energize the starting motor relay 40 thus opening the contact arm 40' and turning off the starting motor 41. During the delay period, however, the motor has been turned over a sufficient number of times to insure complete suction of the pickling oil within all of the cylinders and thus the pickling operation is properly completed. The short delay afforded by the second annular detent 33'' prevents the starter mechanism from operating until the engine is at rest.

As the embodiment of Figure 2, repeated metered portions of pickling oil may be applied by simply turning on or off the ignition switch.

One of the most important features of the invention as described is the fact that the pickling takes place just before the engine is to be shut down for any length of time which is the very time when a protective coating is most needed, since the chemical deterioration and corrosion heretofore mentioned are most active when the engine is not operating.

From the foregoing description, it will be evident that the present invention has provided an extremely economical and useful pickling unit for conventional automobile engines. The installation is relatively simple and does not require any major modification of any of the engine components. Moreover, no attention is required of the operator of the vehicle since the pickling is effected entirely automatically upon turning off of the ignition switch. The only burden on the automobile operator, in fact, is to make sure that the reservoir 10 is maintained filled but this can readily be checked by service station personnel each time the automobile is brought into a service station for gas, oil, or other services.

Many modifications that fall clearly within the scope and spirit of this invention will occur to those skilled in the art. The invention is, therefore, not to be thought of as limited to the particular pickling unit described for illustrative purposes only.

What is claimed is:

1. A pickling unit for providing pickling oil to an internal combustion engine, comprising, in combination: a reservoir for said pickling oil; a pump means responsive to shutting off of said engine for delivering a metered portion of pickling oil from said reservoir to said engine; and a time delay means for maintaining the turning over of said engine for a given period of time upon actuation of said pump means.

2. The subject matter of claim 1, in which said pump means includes a cylindrical chamber in the lower portion of said reservoir; a piston member reciprocal in said chamber; a solenoid having a plunger connected to said piston head to raise said head upon energization; spring means biasing said head to its lowermost position upon de-energization of said solenoid; a first check valve means below said piston passing oil from said chamber upon downward movement of said piston head; and a second check valve means in said piston head passing oil from said reservoir to said chamber upon upward movement of said piston head.

3. The subject matter of claim 2, in which said time delay means includes a pair of switch contacts biased to open position and secured adjacent to said plunger, one of said switch contacts being in physical engagement with said plunger; said plunger including a recessed area juxtaposed said one of said switch contacts for receiving the same to open said contacts only when said plunger is in its lowermost position; said second check valve means in said piston head comprising an annular downwardly directed flexible lip about said piston head in engagement with the cylindrical wall of said chamber when said plunger is moving down and separated from said wall to pass oil when said plunger is moving up, the period of time for said plunger to move from its upper position to its lowermost position being equal to said time delay.

4. A pickling unit for providing pickling oil to an internal combustion engine, comprising, in combination: a reservoir for said pickling oil; a piston pump connected to said reservoir and responsive to shutting off of said engine for delivering a metered portion of said pickling oil to said engine upon downward movement of said piston; and a time delay switch for maintaining the turning over of said engine a given period of time upon actuation of said pump, said time delay switch having contacts mechanically responsive to movement of said piston to open only when said piston has reached its lowermost position whereby the period of time for said piston to complete a downward pumping stroke is equal to said time delay.

5. In an internal combustion engine having a carburetor battery, ignition switch, and an electrical system including an ignition coil and starting motor, a pickling unit for supplying pickling oil to the cylinders of said engine by way of said carburetor in response to opening of said ignition switch, comprising: a container for holding said pickling oil; passage means from said container to said carburetor; solenoid operated pump means in said passage means for supplying a metered quantity of said pickling oil upon de-energization of said solenoid to said carburetor; a time delay switch adapted to close in response to energization of said solenoid and to open a given time interval after de-energization of said solenoid; means connecting said solenoid to said ignition switch for energization upon closing of said ignition switch and de-energization upon opening of said ignition switch; and means connecting said time delay switch between said battery and said electrical system whereby turning off of said engine by opening said ignition switch delivers said pickling oil to said carburetor while said engine is turned over during said time delay period.

6. The subject matter of claim 5, in which said time delay switch is connected to said ignition coil whereby said engine is maintained in operation during said delay period by its own power.

7. The subject matter of claim 5, in which said time delay switch is connected to operate said starting motor during said time delay period.

References Cited in the file of this patent

UNITED STATES PATENTS

| | | |
|---|---|---|
| 2,428,915 | Keller | Oct. 14, 1947 |
| 2,711,725 | Kovacs | June 28, 1955 |
| 2,737,172 | Prindle | Mar. 6, 1956 |